United States Patent Office 3,489,539
Patented Jan. 13, 1970

3,489,539
MANGANIDING
Newell C. Cook, Schenectady, N.Y., assignor to General Electric Company, a corporation of New York
No Drawing. Filed Nov. 10, 1966, Ser. No. 593,271
Int. Cl. B23p 3/00
U.S. Cl. 29—194   12 Claims

ABSTRACT OF THE DISCLOSURE

A manganide coating is formed on certain specified base metal compositions by forming an electric cell joined through an external electrical circuit to a manganese anode using a specified fused salt electrolyte maintained at a temperature of at least 700° C., but below the melting point of the metal composition in substantial absence of oxygen. This cell generates electricity, but, if desired, an external E.M.F. may be impressed providing the cathode current density does not exceed 10 amperes/dm.$^2$. The manganide coating is a composition containing both manganese and the metal of the substrate. The process is therefore useful in producing such diffusion coatings on metal substrates.

---

This invention relates to a method for metalliding a base metal composition. More particularly, this invention is concerned with a process for manganiding a base metal composition in a fused salt bath.

I have discovered that a uniform tough, adherent manganide coating can be formed on a specific group of metals employing low current densities, that is, current densities in the range of 0.05–10 amperes/dm.$^2$.

In accordance with the process of this invention, the manganese metal is employed as the anode and is immersed in a fused salt bath composed essentially of a member of the class consisting of the alkali metal fluorides and mixtures of the alkali metal fluorides with a member of the group consisting of calcium fluoride, strontium fluoride and barium fluoride, and containing from 0.01–5 mole percent of manganese fluoride. The cathode employed is the base metal upon which deposit is to be made. I have found that such a combination is an electric cell in which an electric current is generated when an electrical connection, which is external to the fused bath, is made between the base metal cathode and the manganese anode. Under such conditions, the manganese dissolves in the fused salt bath and manganese ions are discharged at the surface of the base metal cathode where they form a deposit of manganese which immediately diffuses into and reacts with the base metal to form a manganide coating.

In the specification and claims I use the term "manganide" to designate any solid solution or alloy of manganese and the base metal regardless of whether the base metal does or does not form an intermetallic compound with manganese in definite stoichiometric proportions which can be represented by a chemical formula.

The rate of dissolution and deposition of the manganese is self regulating in that the rate of deposition is equal to the rate of diffusion of the manganese into the base metal cathode. The deposition rate can be decreased by inserting some resistance in the circuit. A faster rate can be obtained by impressing a limited amount of voltage into the circuit to supply additional direct current.

The alkali metal fluorides which can be used in accordance with the process of this invention include the fluorides of lithium, sodium, potassium, rubidium and cesium. However, it is preferred to employ an eutectic mixture of sodium fluoride and lithium fluoride because some free alkali metal is produced by a displacement reaction and potassium, rubidium and cesium are volatilized with the obvious disadvantages. It is particularly preferred to employ lithium fluoride as the fused salt bath in which the manganese fluoride is dissolved, because at the temperatures at which the cell is operated, lithium metal is not volatilized to any appreciable extent. Mixtures of the alkali metal fluorides with calcium fluoride, strontium fluoride, and/or barium fluoride, can also be employed as a fused salt in the process of this invention.

The chemical composition of the fused salt bath is critical if good manganide coatings are to be obtained. The starting salt should be as anhydrous and as free of all impurities as is possible or should be easily dried or purified by simply heating during the fusion step. Because oxygen interferes, the process must be carried out in the substantial absence of oxygen. Thus, for example, the process can be carried out in an inert gas atmosphere or in a vacuum. By the term "substantial absence of oxygen" it is meant that neither atmospheric oxygen nor oxides of metals are present in the fused salt bath. The best results are obtained by starting with reagent grade salts and by carrying out the process under vacuum or an inert gas atmosphere, for example, in an atmosphere of nitrogen, forming gas (90% $N_2$, 10% $H_2$), argon, helium, neon, krypton or xenon.

I have sometimes found that even commercially available reagent grade salts must be purified further in order to operate satisfactorily in my process. This purification can be readily done by utilizing scrap base metal articles as the cathodes and carrying out the initial manganiding runs with or without an additional applied voltage, thereby plating out and removing from the bath those impurities which interfere with the formation of high quality manganide coatings.

The base metals which can be manganided in accordance with the process of this invention included the metals having atomic numbers of from 23, 24, 26 to 29, 41 to 47 and 73 to 79 inclusive. These base metals are, for example, vanadium, chromium, iron, cobalt, nickel, copper, niobium, molybdenum, technetium, ruthenium, rhodium, palladium, sliver, tantalum, tungsten, rhenium, osmium, iridium, platinum and gold. Alloys of these base metals with each other or alloys containing these base metals as the major constituent, that is, over 50 mole percent, allowed with other metals as a minor constituent, that is, less than 50 mole percent, can also be manganided in accordance with my process, providing the melting point of the resulting alloy is not lower than the temperature at which the fused salt bath is being operated. It is preferred that the alloy contain at least 75 mole percent of the base metal and even more preferred, that the alloy contain 90 mole percent of the base metal with correspondingly less of the alloying constituent.

I have also found that when the base metal to be manganided is vanadium, niobium, tantalum, chromium, molybdenum or tungsten, it is necessary to conduct the manganiding process in the absence of carbon, because carbon forms a very stable metal carbide on the surface of such base metals thereby rendering it impossible to further manganide the base metal and giving less firmly adhering deposits. I have found that carbon can be removed from the fused salt bath by operating it as a cell employing as a cathode, the base metals such as vanadium or niobium, until the carbide coating is no longer formed on the surface of the base metal.

The form of the anode is not critical. For example, I can employ as the anode pure manganese metal in the form of a rod or strip or the manganese can be employed in the form of chips in a porous iron or monel basket. I can also employ manganese alloyed with copper wherein the manganese constitutes a major portion of the alloy, i.e., over fifty mole percent and preferably more than ninety mole percent of the alloy and the amount of copper is less than fifty mole percent and preferably less than ten mole percent.

In order to produce a reasonably fast plating rate and to insure the diffusion of the manganese into the base metal to form a manganide, I have found it desirable to operate my process at a temperature no lower than about 700° C. It is usually preferred to operate at temperatures of from 900°–1100° C. and even more preferably, from 1000°–1100° C.

The temperature at which the process of this invention is conducted is dependent to some extent upon the particular fused salt bath employed. Thus, for example, when temperatures as low as 700° C. are desired, an eutectic of potassium fluoride and lithium fluoride can be employed. Inasmuch as the preferred operating range is from 900° C. to 1100° C., I prefer to employ lithium fluoride as the fused salt.

When an electrical circuit is formed external to the fused salt bath by joining the manganese anode to the base metal cathode by means of a conductor, an electric current will flow through the circuit without any applied electromotive force. The anode acts by dissolving in the fused salt bath to produce electrons and manganese ions. The electrons flow through the external circuit formed by the conductor and the manganese ions migrate through the fused salt bath to the base metal cathode to be metallided, where the electrons discharge the manganese ions as a manganide coating. The amount of current can be measured with an ammeter which enables one to readily calculate the amount of manganese being deposited on the base metal cathode and being converted to the metallide layer. Knowing the area of the article being plated, it is possible to calculate the thickness of the metallide coating formed, thereby permitting accurate control of the process to obtain any desired thickness of the metallide layer.

Although the process operates very satisfactorily without impressing any additional electromotive force on the electrical circuit, I have found it possible to apply a small voltage when it is desired to obtain constant current densities during the reaction, and to increase the deposition rate of the manganese being deposited without exceeding the diffusion rate of the manganese into the base metal cathode. The additional E.M.F. should not exceed 1.0 volt and preferably should fall between 0.1 and 0.5 volt.

When it is desirable to apply additional voltage to the circuit in order to shorten the time of operation, the total current density should not exceed 10 amperes/dm.$^2$. At current densities above 10 amperes/dm.$^2$, the manganese deposition rate exceeds the diffusion rate and the base metal cathode becomes coated with a plate of pure manganese.

Since the diffusion rate of manganese into the cathode article varies from one material to another, with temperature, and with the thickness of the coating being formed, these is always a variation in the upper limits of the curent densities that may be employed. Therefore, the deposition rate of the iding agent must always be adjusted so as not to exceed the diffusion rate of the iding agent into the substrate material if high efficiency and high quality diffusion coatings are to be obtained. The maximum curent density for good manganiding is 10 amperes/dm.$^2$, when operating within the preferred temperature ranges of this disclosure. Higher current densities can sometimes be used to form coatings with manganese but in addition to the formation of a metallide coating, plating of the iding agent occurs over the diffusion layer.

Very low current densities (0.01–0.1 amp/dm.$^2$) are often employed when diffusion rates are correspondingly low, and when very dilute surface solutions or very thin coatings are desired. Often the composition of the diffusion coating can be changed by varying the current density, producing under one condition a composition suitable for one application and under another condition a composition suitable for another application. Generally, however, current densities to form good quality manganide coatings fall between 0.5 and 5 amperes per dm.$^2$ for the preferred temperature ranges of this disclosure.

If an applied E.M.F. is used, the source, for example, a battery or other source of direct current, should be connected in series with the external circuit so that the negative terminal is connected to the external circuit, terminating at the base metal being metallided and the positive terminal is connected to the external circuit terminating at the manganese anode. In this way, the voltages of both sources are algebraically additive.

As will be readily apparent to those skilled in the art, measuring instruments such as voltmeters, ammeters, resistances, timers, etc., may be included in the external circuit to aid in the control of the process.

Because the tough adherent corrosion resistant properties of the manganide coatings are uniform over the entire treated area, the manganide coated metal compositions prepared by my process have a wide variety of uses. They can be used to fabricate vessels for chemical reactions, damping devices, to make gears, bearings and other articles requiring hard, wear resistant surfaces. Other uses will be readily apparent to those skilled in the art as well as other modifications and variations of the present invention in light of the above teachings.

The following examples serve to further illustrate my invention. All parts are by weight unless otherwise stated.

Example 1

Lithium fluoride (8625 grams) was charged into a Monel liner (5½" in diameter x 17¾" deep) fitted into a mild steel pot (6" in diameter x 18" deep). The pot was placed in an electric furnace (6½" in diameter x 20" deep). The mild steel pot has a flange at the upper portion which was connected to a cover plate of nickel plated steel which contained a water channel for cooling, two ports (2½" in diameter) for glass electrode towers and two 1" ports for a thermocouple probe and a gas bubbler or vacuum connection. A vacuum was pulled on the cell and the lithium fluoride melted. Forming gas (90% $N_2$, 10% $H_2$) was then bled into the cell and manganous fluoride (29.5 grams) was added to the lithium fluoride to make the fused salt 0.1 mole percent manganese fluoride. While continuously passing forming gas through the cell, a manganese anode (6" x 1") containing 1% copper was immersed 3" into the fused salt bath through the anode port and a nickel strip (6" x 1" x 0.020") was inserted through the cathode port. The nickel strip was then manganided according to the following data.

TABLE I

| Time, (min.): | Volts Anode Polarity | Current Density, amp/dm.$^2$ | |
|---|---|---|---|
| 0 | −0.305 | 0 | |
| 2 | −0.321 | 0 | Current on. |
| 3 | −0.010 | 1.0 | |
| 4 | +0.058 | 1.0 | |
| 12 | +0.130 | 1.0 | |
| 32 | +0.185 | 1.0 | Current off. |
| 32:10 | −0.015 | 0 | |
| 35 | −0.054 | 0 | |

The nickel sample as removed from the salt was covered with a black coating which was removed by washing. The sample was found to have gained 0.427 gram of a theoretical 0.501 gram based on reducing $Mn^{++}$ ions to $Mn°$. The sample contained a coating 2 mils. thick which was dark grey, somewhat spotty and very flexible. Two additional runs identical to the above were made at which time the sample came out bright and smooth with very little salt adhering to the surface.

Table II summarizes the results of manganiding several other pure metals and alloys in the same apparatus and in accordance with the general procedure described in Example 1.

barium fluoride, and from 0.01–5 mole percent of manganeous fluoride, said electrolyte being maintained at a temperature of at least 900° C., but below the melting

TABLE II

| Metal | Temp., °C. | Time, Min. | Current Density, amp/dm.² | Weight Gained, Grams | Percent Colombic Efficiency | Description of Coating |
|---|---|---|---|---|---|---|
| Ti-Namel | 950 | (¹) | 0.66 | 3.1 | 76 | 5 mil coat; bright, smooth, soft, flexible. |
| Do | 1,000 | 58 | 1.32 | 0.290 | 95 | 0.5 mil coat; bright, smooth, soft, flexible. |
| Nickel | 1,100 | 10 | 2.6 | 0.176 | 100 | 0.4 mil coat; bright, smooth, soft, flexible. |
| Cobalt | 1,100 | 60 | 0.86 | 0.234 | 88 | 1.3 mil coat; bright, smooth, soft, flexible. |
| Vanadium | 1,100 | 30 | 0.90 | 0.249 | 0 | 1 mil coat; bright, grainy, hard, mod. flexible ~0.5 mil inner layer, predominately diffusion. |
| Niobium | 1,100 | 15 | 0.74 | 0.066 | 42 | 0.5 mil coat; bright, smooth, hard, flexible. |
| Molybdenum | 900 | 30 | 1.5 | 0.044 | 84 | 0.5 mil coat; shiny, smooth, hard, mod. flexible. |
| Do | 1,100 | (²) | 0.15 | 0.675 | 52 | Complete diffusion, 1.5 mil growth in 20 mils thick sample; bright, smooth, soft, brittle. |
| Palladium | 1,100 | 35 | 1.1 | 0.144 | 96 | 3 mil coat; bright, smooth, soft, flexible. |
| Platinum | 1,100 | 53 | 0.9 | 0.052 | 98 | 2 mil coat; bright, smooth, slightly harder than base platinum, flexible. |
| Copper | 900 | 120 | 0.7 | 0.550 | 99 | 3 mil coat; bright, smooth, soft, flexible. |
| Silver | 900 | 60 | 0.31 | 0.047 | 89 | 1 mil coat; bright, smooth, slightly harder than base silver, flexible. |
| Gold | 900 | 45 | 2.0 | 0.196 | 98 | 2 mil coat; bright, grainy, hard, stiff. |
| Monel | 900 | 60 | 0.46 | 0.514 | 96 | 2 mil coat; bright, smooth, soft, flexible. |
| Rodar | 1,100 | 60 | 0.64 | 0.197 | 73 | 1.5 mil coat; bright, smooth, soft, flexible. |
| Fe-Cr (28) | 1,100 | 40 | 1.0 | 0.254 | 72 | 1 mil coat; bright, smooth, soft, flexible. |
| 304 Stainless Steel | 1,100 | 115 | 0.56 | 0.482 | 94 | 2 mil coat; bright, smooth, soft, flexible. |

¹ 15 hours. ² 11 hours.

Example 2

A tungsten strip (3" x 1" x 0.010") was employed as a cathode in accordance with the procedure described in Example 1 and in the cell described in Example 1 at 1100° C. The data on this test are given in Table III.

TABLE III

| Time (min.): | Volts Anode Polarity | Current Density, amps/dm.² | |
|---|---|---|---|
| 0 | −0.289 | 0 | |
| 1 | −0.290 | 0 | Current on. |
| 2 | +0.012 | 0.3 | Current off. |
| 31 | +0.013 | 0.3 | |
| 62 | +0.012 | 0.3 | |
| 63 | −0.026 | 0 | |
| 68 | −0.162 | 0 | |

The tungsten cathode gained approximately 1 mg. in weight and was shiny and smooth and looked unchanged to the naked eye. A microscopic examination showed that there was a very thin coating on the surface of the tungsten which was slightly harder than the untreated tungsten. X-ray examination showed the presence of high concentration of manganese on the surface of the tungsten.

When a copper wire and a tungsten strip were immersed in the salt bath so that the copper touched the tungsten, and the pair manganided at 900° C., a strong, smooth welded surface resulted in which the manganese and copper flowed easily over the tungsten surface. This indicated that the manganese dissolves in the tungsten surface, but because of the refractory character of tungsten, the solubility of the manganese is slow and therefore concentrated on the surface of the tungsten.

It will, of course, be apparent to those skilled in the art that modifications other than those set forth in the above examples, can be employed in the process of this invention without departing from the scope thereof.

What I claim as new and desire to secure by Letters Patent of the United States is:

1. A method of forming a manganide coating on a metal composition having a melting point of greater than 900° C., at least 50 mole percent of said metal composition being at least one of the metals selected from the class consisting of metals whose numbers are 23, 24, 26 to 29, 41 to 47 and 73 to 79, said method comprising (1) forming an electric cell containing said metal composition as the cathode, joined through an external electrical circuit to a manganese anode and fused salt electrolyte which consists essentially of a member of the class consisting of lithium fluoride, sodium fluoride, mixtures thereof and mixtures of said fluorides with a member of the class consisting of calcium fluoride, strontium fluoride and barium fluoride, and from 0.01–5 mole percent of manganeous fluoride, said electrolyte being maintained at a temperature of at least 900° C., but below the melting point of said metal composition in the substantial absence of oxygen, (2) controlling the current flowing in said electric cell so that the current density of the cathode does not exceed 10 amperes/dm.² during the formation of manganide coating, and (3) interrupting the flow of electrical current after the desired thickness of the manganide coating is formed on the metal object.

2. The process of claim 1, wherein the fused salt electrolyte consists essentially of lithium fluoride and manganeous fluoride.

3. The process of claim 1 which is also conducted in the substantial absence of carbon.

4. The process of claim 1 wherein the absence of oxygen is obtained by use of an inert gas in the cell.

5. The method of claim 1 wherein the metal composition is nickel.

6. The method of claim 1 wherein the metal composition is cobalt.

7. The method of claim 1 wherein the metal composition is vanadium.

8. The method of claim 1 wherein the metal composition is molybdenum.

9. The method of claim 1 wherein the metal composition is tungsten.

10. The method of claim 1 wherein the metal composition is iron.

11. The method of claim 1 wherein the metal composition is copper.

12. A methal product produced in accordance with the process of claim 1.

References Cited

UNITED STATES PATENTS

| 2,828,251 | 3/1958 | Sibert et al. | 204—39 |
| 3,024,175 | 3/1962 | Cook | 204—39 |
| 3,024,176 | 3/1962 | Cook | 204—39 |
| Re. 25,630 | 8/1964 | Cook | 204—39 |
| 3,232,853 | 2/1966 | Cook | 204—39 |

FOREIGN PATENTS 742,190  9/1966  Canada.

OTHER REFERENCES

J. Electrochemical Society, vol. 112, No. 3, 1965, pp. 266–272.

HOWARD S. WILLIAMS, Primary Examiner

R. L. ANDREWS, Assistant Examiner

U.S. Cl. X.R.

204—39